(12) United States Patent
Ackerson et al.

(10) Patent No.: US 10,260,009 B2
(45) Date of Patent: Apr. 16, 2019

(54) HYDROPROCESSING METHOD WITH HIGH LIQUID MASS FLUX

(71) Applicant: P.D. TECHNOLOGY DEVELOPMENT, LLC, Fayetteville, AR (US)

(72) Inventors: Michael D. Ackerson, Elkins, AR (US); Michael Steven Byars, Fayetteville, AR (US)

(73) Assignee: Duke Technologies, LLC, Fayetteville, AR (US)

( * ) Notice: Subject to any disclaimer, the term of this patent is extended or adjusted under 35 U.S.C. 154(b) by 121 days.

(21) Appl. No.: 15/227,705

(22) Filed: Aug. 3, 2016

(65) Prior Publication Data

US 2017/0037325 A1   Feb. 9, 2017

Related U.S. Application Data

(60) Provisional application No. 62/200,816, filed on Aug. 4, 2015.

(51) Int. Cl.
*C10G 45/00* (2006.01)
*C10G 45/04* (2006.01)
(Continued)

(52) U.S. Cl.
CPC ............ *C10G 45/04* (2013.01); *C10G 45/00* (2013.01); *C10G 47/02* (2013.01); *C10G 65/02* (2013.01);
(Continued)

(58) Field of Classification Search
CPC ........ C10G 45/00; C10G 45/04; C10G 47/02; C10G 65/02; C10G 2300/202; C10G 2300/205
See application file for complete search history.

(56) References Cited

U.S. PATENT DOCUMENTS 4,615,789 A   10/1986  Bridge et al.
4,937,051 A    6/1990  Graven et al.
(Continued)

FOREIGN PATENT DOCUMENTS

WO    WO2017024061    2/2017

OTHER PUBLICATIONS

International Search Report and Written Opinion of the International Search Authority (ISA/US) dated Oct. 17, 2016 in counterpart International PCT Patent Application No. PCT/US2016/045402.

*Primary Examiner* — Prem C Singh
*Assistant Examiner* — Brandi M Doyle
(74) *Attorney, Agent, or Firm* — Grady K. Bergen; Griggs Bergen LLP

(57) ABSTRACT

In a method of hydroprocessing, hydrogen gas for the hydroprocessing reaction is combined with a liquid feed composition comprising a feedstock to be treated and a diluent to form a feed stream, at least a portion of the hydrogen gas being dissolved in the liquid feed composition of the feed stream, with non-dissolved hydrogen gas being present in the feed stream in an amount of from 1 to 70 SCF/bbl of the liquid feed composition. The feed stream is contacted with a hydroprocessing catalyst, within a reactor while maintaining a liquid mass flux within the reactor of at least 5000 lb/hr·ft² to form a hydroprocessed product.

20 Claims, 1 Drawing Sheet

(51) Int. Cl.
*C10G 47/02* (2006.01)
*C10G 65/02* (2006.01)

(52) U.S. Cl.
CPC . *C10G 2300/202* (2013.01); *C10G 2300/205* (2013.01)

(56) References Cited

U.S. PATENT DOCUMENTS

| | | | | |
|---|---|---|---|---|
| 6,017,443 | A * | 1/2000 | Buchanan | C10G 65/04 208/210 |
| 6,072,093 | A | 6/2000 | O'Neill et al. | |
| 6,632,350 | B2 * | 10/2003 | Gupta | C10G 65/02 208/210 |
| 2005/0082202 | A1 * | 4/2005 | Ackerson | C10G 45/22 208/213 |
| 2006/0144756 | A1 * | 7/2006 | Ackerson | C10G 45/16 208/108 |
| 2007/0138056 | A1 | 6/2007 | Farshid et al. | |
| 2007/0215521 | A1 | 9/2007 | Havlik et al. | |
| 2012/0074038 | A1 * | 3/2012 | Petri | C10G 65/10 208/59 |
| 2012/0103868 | A1 | 5/2012 | Dindi et al. | |
| 2014/0261715 | A1 * | 9/2014 | Abhari | C10L 10/00 137/12 |

\* cited by examiner

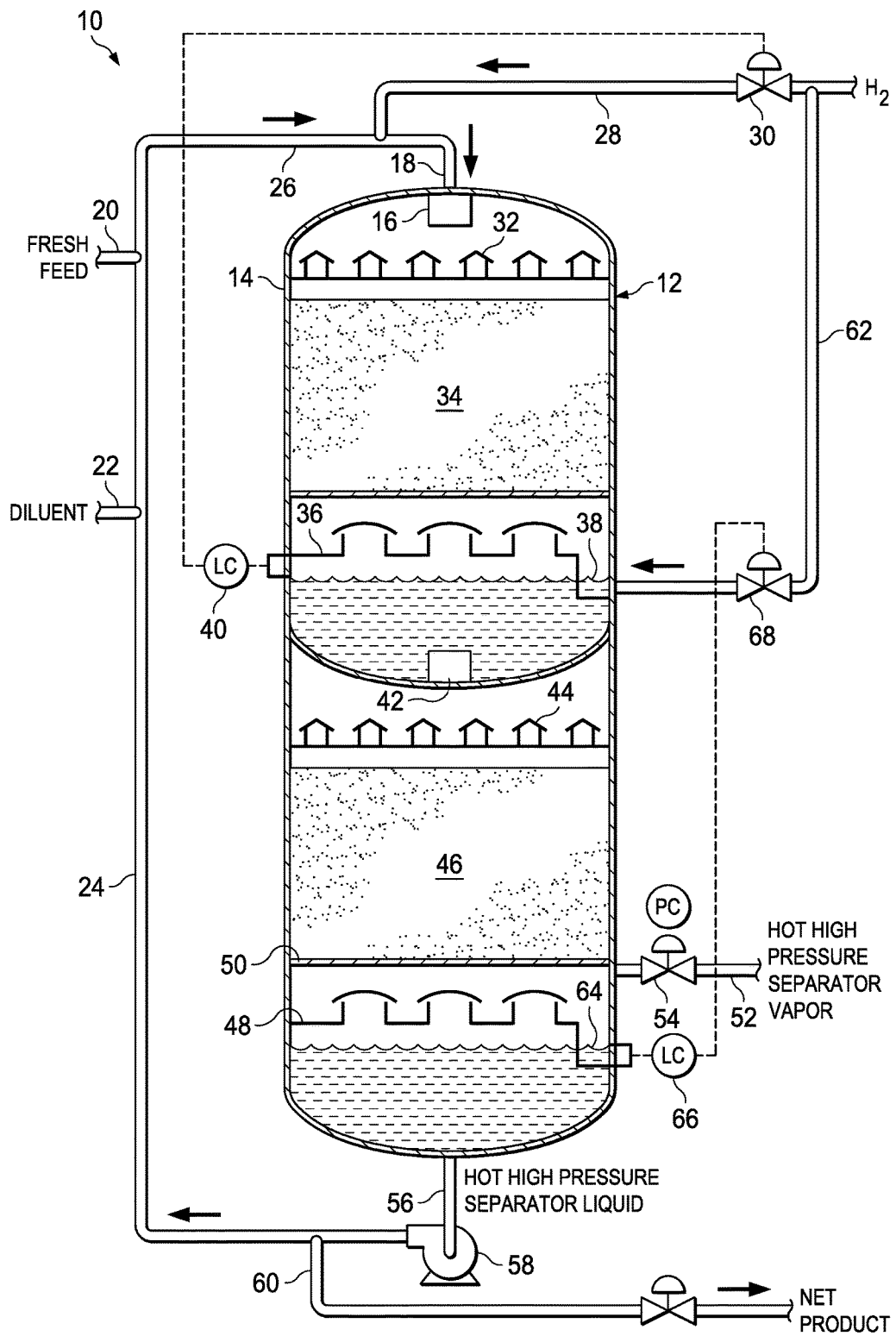

HYDROPROCESSING METHOD WITH HIGH LIQUID MASS FLUX

CROSS-REFERENCE TO RELATED APPLICATIONS

This application claims the benefit of U.S. Provisional Application No. 62/200,816, filed Aug. 4, 2015, which is incorporated herein by reference in its entirety for all purposes.

FIELD OF THE INVENTION

The invention relates to a hydroprocessing process wherein a liquid feedstock is catalytically reacted with hydrogen inside a reactor.

BACKGROUND

In hydroprocessing, which may include hydrotreating, hydrofinishing, hydrorefining, and hydrocracking, a catalyst is used for reacting hydrogen with hydrocarbons, such as a petroleum fraction, distillates, resids, or other hydrocarbon compounds, for the purpose of saturating olefins or removing heteroatoms, such as sulfur, nitrogen, oxygen, metals, or other contaminants, or for molecular weight reduction (cracking). Catalysts having special surface properties are required in order to provide the necessary activity to accomplish the desired reaction(s).

In conventional hydroprocessing it is necessary to transfer hydrogen from a vapor phase into the liquid phase where it is available to react with a hydrocarbon molecule at the surface of the catalyst. This is accomplished by circulating very large volumes of hydrogen gas and the liquid hydrocarbon feed through a catalyst bed. The liquid feed and the hydrogen flow through the bed and the hydrogen is absorbed into a thin film of liquid hydrocarbon that is distributed over the catalyst. Because the amount of hydrogen gas required for the hydroprocessing reaction can be quite large, e.g., 1000 to 5000 SCF/bbl (0.178 to 0.890 $m^3$/L) of liquid, the reactors are very large and are operated at severe conditions, from a few hundred psi to as much as 5000 psi (34.5 MPa), and temperatures from around 400° F.-900° F. (204° C.-482° C.). Furthermore, because conventional processes move very large quantities of hydrogen gas through the reactor, they also require the use of very large external high-pressure separators to recover gas from the product stream. These high-pressure separators may be as large as the hydroprocessing reactors and are a significant capital equipment cost.

Hydroprocessing rates are typically measured in terms of mass flux, which can be defined as the mass flow rate per unit area. In a reactor the mass flux is the mass flow rate through a reactor divided by the cross-sectional area of the reactor. Typical mass flux in hydroprocessing reactors fall in the range of from 1,000 lb/hr·$ft^2$ (4880 kg/hr·$m^2$) to less than 5,000 lb/hr·$ft^2$ (24,400 kg/hr·$m^2$). Although it is preferable to move liquid feedstocks through the reactor at the greatest rate and volume as possible (i.e., a higher mass flux), a variety of limitations, including excessive pressure drop, hydrogen mass transfer concerns, liquid holdup, and wetting inefficiencies, have necessitated that mass flux rates remain within the range of from 1,000 lb/hr·$ft^2$ (4880 kg/hr·$m^2$) to less than 5,000 lb/hr·$ft^2$ (24,400 kg/hr·$m^2$) for optimum process efficiency.

A method for hydroprocessing is disclosed in U.S. Pat. No. 4,937,051, entitled Catalytic Reactor with Liquid Recycle, issued to Graven et al. on Jun. 26, 1990. Graven et al. discloses a continuous catalytic reactor column for contacting oil and a treating gas in a multiphase fixed bed catalytic reactor having at least two operatively connected catalyst beds . . . and including means for maintaining total liquid flux in at least one catalyst bed at a rate of about 2000 lb/hr·$ft^2$ (9760 kg/hr·$m^2$). Graven et al. also states that, "[i]a typical multi-phase reactor system, the average gas-liquid volume ratio in the catalyst zone is about 1:4 to 20:1 under process conditions. Preferably the liquid is supplied to the catalyst bed at a rate to occupy about 10 to 50% of the void volume."

A typical range for mass flux in a hydroprocessing reactor is disclosed in U.S. Pat. No. 7,655,135, entitled Process for Removing Solid Particles from a Hydroprocessing Feed, issued to Havlik et al. on Feb. 2, 2010. Havlik, et al., discloses a process for removing inorganic solid contaminants 10 microns and smaller from a hydroprocessing feed stream wherein lower mass fluxes are expected to allow a higher utilization factor due to lower velocities which promotes solids laydown in a guard bed that has the purpose of trapping solids before a feed is introduced into a typical hydroprocessing reactor. Havlik et al. suggests a preferred mass flux of 500 lb/hr·$ft^2$ (2440 kg/hr·$m^2$) and a more preferred mass flux of 1,000 lb/hr·$ft^2$ (4880 kg/hr·$m^2$) for the guard bed in the disclosed invention. Havlik et al. goes on to provide an example of a 20,000 bbl/day (3179 $m^3$/day) gas-to-liquids plant wherein the guard bed operates at a mass flux of half of the mass flux of the subsequent hydrocracker, which is disclosed as being as 1500 lb/hr·$ft^2$ (7320 kg/hr·$m^2$).

U.S. Pat. No. 6,569,313, entitled Integrated Lubricant Upgrading Process, issued to Carroll et al. provides further support of the typically accepted mass flux in catalytic hydroprocessing. It is described therein that in the preferred embodiment the catalytic dewaxing segment of the process advantageously, the liquid flux rate for total feed rate (including optional liquid recycle) is maintained in the range of 500-3500 lb/hr·$ft^2$ (2440-17,100 kg/hr·$m^2$), preferably 1000-3000 lb/hr·$ft^2$ (4880-14,600 kg/hr·$m^2$).

In U.S. Pat. App. Pub. No. 2012/0074038, entitled Liquid Phase Hydroprocessing with Low Pressure Drop, of Petri et al., a process is disclosed wherein the mass flux in a hydroprocessing reactor may be in excess of 6000 lb/hr·$ft^2$ (29,300 kg/hr·$m^2$). This process is limited in that the average size of the catalyst particles utilized must be in the range of 100 nm-1.27 mm. As stated therein, larger catalyst sizes require that the mass flux of the reactor be reduced.

SUMMARY

In a method of hydroprocessing hydrogen gas for the hydroprocessing reaction is combined with a liquid feed composition comprising a feedstock to be treated and a diluent to form a feed stream. At least a portion of the hydrogen gas is dissolved in the liquid feed composition of the feed stream, with non-dissolved hydrogen gas being present in the feed stream in an amount of from 1 to 70 SCF/bbl (0.000178 to 0.0125 $m^3$/L) of the liquid feed composition. The feed stream is contacted with a hydroprocessing catalyst within a reactor while maintaining a liquid mass flux within the reactor of at least 5000 lb/hr·$ft^2$ (24,400 kg/hr·$m^2$) to form a hydroprocessed product.

In particular embodiments the feedstock may be at least one of a petroleum feedstock, a non-petroleum feedstock, a bio oil, a pyrolysis oil, a high-contaminant feedstock, and a high-olefinic feedstock.

The feed stream may be contacted with a hydroprocessing catalyst contained in at least two catalyst beds within the reactor.

In some embodiments, the non-dissolved hydrogen gas in the feed stream may be present in an amount of from 1 to 50 SCF/bbl (0.000178 to 0.0089 m$^3$/L) of the liquid feed composition.

The liquid mass flux within the reactor may be maintained at from 5000 to 100,000 lb/hr·ft$^2$ (24,400 to 488,000 kg/hr·m$^2$) in particular embodiments. In others, the liquid mass flux within the reactor may be maintained at from 10,000 lb/hr·ft$^2$ (48,800 kg/hr·m$^2$) or more. In still others, the liquid mass flux within the reactor may be maintained at from 30,000 lb/hr·ft$^2$ (146,000 kg/hr·m$^2$) or more.

In particular embodiments, at least a portion of the hyroprocessed product is used to form the diluent.

In further embodiments, gas is separated from liquid hydroprocessed product in a separator located within the reactor.

Liquid levels may be maintained within the reactor by controlling the amount of hydrogen gas added to the feedstream. Further, the volume of gas within the reactor is maintained in a near stagnant condition.

In another method of hydroprocessing, hydrogen gas for the hydroprocessing reaction is combined with a liquid feed composition comprising a feedstock to be treated and a diluent to form a feed stream. At least a portion of the hydrogen gas is dissolved in the liquid feed composition of the feed stream, with non-dissolved hydrogen gas being present in the feed stream in an amount of from 1 to 50 SCF/bbl (0.000178 to 0.0089 m$^3$/L) of the liquid feed composition. The feed stream is contacted with a hydroprocessing catalyst contained in at least two catalyst beds contained within a reactor while maintaining a liquid mass flux within the reactor of from 10,000 to 100,000 lb/hr·ft$^2$ (48,800 to 488,000 kg/hr·m$^2$) to form a hydroprocessed product.

The liquid mass flux within the reactor may be maintained at from 30,000 lb/hr·ft$^2$ (146,000 kg/hr·m$^2$) or more in some embodiments.

In particular embodiments, at least a portion of the hyroprocessed product is used to form the diluent.

In further embodiments, gas is separated from liquid hydroprocessed product in a separator located within the reactor.

Liquid levels may be maintained within the reactor by controlling the amount of hydrogen gas added to the feedstream. Further, the volume of gas within the reactor is maintained in a near stagnant condition, which may be accomplished by controlling the separated gas removed from the reactor.

BRIEF DESCRIPTION OF THE DRAWINGS

For a more complete understanding of the disclosure, reference is now made to the following descriptions taken in conjunction with the accompanying figures, in which:

FIG. 1 is a schematic of a hydroprocessing reactor showing the process flow in accordance with particular embodiments of the invention.

DETAILED DESCRIPTION

The present invention is directed to a hydroprocessing method wherein a liquid diluent is mixed with a liquid hydrocarbon feedstock to be treated and combined with an excess quantity of hydrogen to form a diluent/feedstock/dissolved hydrogen mixture. The mixture enters a hydroprocessing reactor, along with additional hydrogen gas. Liquid and gas flow cocurrently over a catalyst bed in a trickle-like fashion, where liquid flows over the catalyst through a volume of gas.

The process that has been developed wherein the liquid mass flux in a hydroprocessing reactor is significantly greater than the liquid mass flux of conventional hydroprocessing methods. This is accomplished by reducing the hydrogen gas requirement inside the reactor.

As discussed previously, liquid mass flux is defined as the rate of mass flow per unit area. It can be calculated by dividing the amount of mass flowing through the reactor at a given time by the cross-sectional area of the reactor. Liquid mass flux is typically expressed in units of pounds per hour per square foot (lb/hr·ft$^2$) in hydroprocessing applications.

Typical liquid mass flux in conventional hydroprocessing reactors falls in the range of 1,000 lb/hr·ft$^2$ (4880 kg/hr·m$^2$) to less than 5,000 lb/hr·ft$^2$ (24,400 kg/hr·m$^2$). Although it is preferable to move liquid feedstocks through the reactor at the greatest speed and volume as possible (i.e. higher liquid mass flux), a variety of limitations, including excessive pressure drop, hydrogen mass transfer concerns, liquid holdup, and wetting inefficiencies, have necessitated that liquid mass flux rates remain within the range of 1,000 lb/hr·ft$^2$ (4880 kg/hr·m$^2$) to less than 5,000 lb/hr·ft$^2$ (24,400 kg/hr·m$^2$) for optimum process efficiency.

In contrast, processes are disclosed herein wherein hydroprocessing reactors can efficiently operated with a liquid mass flux in the range of at or above 5,000 lb/hr·ft$^2$ (24,400 kg/hr·m$^2$) with no constraints on feedstock quality or catalyst size or material. In particular embodiments, the liquid mass flux may range from at or above 6000 lb/hr·ft$^2$ (29,300 kg/hr·m$^2$), 7000 lb/hr·ft$^2$ (34,200 kg/hr·m$^2$), 8000 lb/hr·ft$^2$ (39,100 kg/hr·m$^2$), 9000 lb/hr·ft$^2$ (43,900 kg/hr·m$^2$), 10,000 lb/hr·ft$^2$ (48,800 kg/hr·m$^2$), 15,000 lb/hr·ft$^2$ (73,200 kg/hr·m$^2$), 20,000 lb/hr·ft$^2$ (97,600 kg/hr·m$^2$), 25,000 lb/hr·ft$^2$ (122,000 kg/hr·m$^2$), 30,000 lb/hr·ft$^2$ (146,000 kg/hr·m$^2$) to 40,000 lb/hr·ft$^2$ (195,000 kg/hr·m$^2$), 50,000 lb/hr·ft$^2$ (244,000 kg/hr·m$^2$), 60,000 lb/hr·ft$^2$ (293,000 kg/hr·m$^2$), 70,000 lb/hr·ft$^2$ (342,000 kg/hr·m$^2$), 80,000 lb/hr·ft$^2$ (391,000 kg/hr·m$^2$), 90,000 lb/hr·ft$^2$ (439,000 kg/hr·m$^2$), 100,000 lb/hr·ft$^2$ (488,000 kg/hr·m$^2$) or more.

It should be noted in the description, if a numerical value or range is presented, each numerical value should be read once as modified by the term "about" (unless already expressly so modified), and then read again as not so modified unless otherwise indicated in context. Also, in the description, it should be understood that an amount range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific points within the range, or even no point within the range, are explicitly identified or refer to, it is to be understood that the inventors appreciate and understands that any and all points within the range are to be considered to have been specified, and that inventors possesses the entire range and all points within the range.

In addition to dramatically higher liquid mass flux in the hydroprocessing reactors, the need for the large high-pressure gas/liquid separators required by conventional hydroprocessing methods is also eliminated. Because of the very small amount of hydrogen gas added into the reactor, the quantities of gas present in the final product are drastically lower. Therefore, the large high-pressure separators can be replaced with very small hot high-pressure separators. These separators can be operated at or near reactor conditions (i.e., temperature and pressure). This translates into a significant cost savings. These small hot high-pressure separators can be located outside of the reactor, as are high-pressure separators in conventional processes, or, because of their small size, the hot high-pressure separators of the present invention may be placed or be located inside the reactor itself. If these small, hot high-pressure separators are located inside the reactor, they can serve the added function of controlling the quantity of hydrogen gas being added to the reactor, as is discussed more fully below.

The hydroprocessing process utilized may include, but is not necessarily limited to, hydrotreating, hydrofinishing, hydrorefining, hydrocracking, hydroisomerization, Fischer-Tropsch, and/or hydrodemetalization process. Suitable catalysts and reaction conditions for such processes are used. Those catalysts used for reacting hydrogen with hydrocarbons, such as a petroleum fraction, distillates, resids, or other hydrocarbon compounds, for the purpose of saturating olefins or removing heteroatoms, such sulfur, nitrogen, oxygen, metals, or other contaminants, or for molecular weight reduction (cracking) may be used. The amount of catalyst used may be that that provides sufficient conversion. In some embodiments, different catalysts may be used in the same catalyst bed or different catalysts beds of the reactor. Reactor temperatures typically range from 250° F. to 800° F. (120° C. to about 430° C.), more particularly from 500° F. to 800° F. (260° C. to 430° C., with from 500° F. to 650° F. (260° C. to 340° C.) being useful in many applications. Reactor pressures may range from 500 psi (3.5 MPa) or more, with from 500 psi to 3000 psi (3.5 MPa to 21 MPa) being useful in many applications. In certain embodiments, the catalysts used may be those having particles with a largest dimension that averages greater than 1.27 mm The hydroprocessing process may be used for treating hydrocarbon feedstocks from petroleum products, as are treated in conventional hydroprocessing. In certain applications, however, the hydrocarbon feed may be a non-petroleum feedstock derived from non-petroleum materials. These may be materials derived from or based on vegetable, animal, and cellulosic materials, coal, and combinations of such materials. The feedstocks may also include pyrolysis oils derived from petroleum and non-petroleum materials.

In some applications, the feedstock may include high-contaminant and/or high-olefinic feedstocks, which is often the case for non-petroleum materials, although petroleum feedstocks may also be high-contaminant and/or high-olefinic feedstocks in certain instances. As used herein, high-contaminant feed stocks are those containing heteroatoms, such as sulfur, nitrogen, oxygen, and metals, which may be at levels of from 10% or more by weight of the feed. High-olefinic feedstocks are those having from 10% or more of olefinic molecules by weight of the feed. As used herein, with respect to olefinic compounds weight percentages are based on weight of the olefinic molecules. With respect to heteroatom contaminants, weight percentages are based upon the weight of the heteroatoms. Such olefinic compounds and heteroatom contaminants may be at levels of from about 10%, 15%, 20%, 25%, 30%, 35%, 40%, 45%, 50% or more by weight or more of the feedstock. In particular, the olefinic compounds and heteroatom contaminants may make up from about 10% to about 50% by weight of the feedstock. In certain embodiments, the feed stock may have an oxygen content of from about 10%, 15%, 20%, 25%, 30%, 35%, 40%, 45%, 50% by weight or more. When treating such high-contaminant and/or high-olefinic feedstocks, modifications, undesirable byproducts and process considerations, such as increased levels of water must be taken into account. Techniques, such as those used in U.S. Pat. No. 9,096,804, which is hereby incorporated by reference herein for all purposes, may be used in the process described herein to accommodate the hydroprocessing of high-contaminant and high-olefinic feedstocks.

In the hydroprocessing process, the hydrogen necessary for the hydroprocessing reaction is combined as hydrogen gas with a liquid feed composition comprising a hydrocarbon feedstock or fresh feed to be treated and a liquid diluent to form a feed stream. This is done without introducing and circulating additional hydrogen gas in the reactor, as with conventional hydroprocessing. The liquid diluents may include, but are not limited to light hydrocarbons, distillates, VGO, or previously hydroprocessed stocks. This may include a recycled portion of the liquid hydroprocessed product formed in the hydroprocessing reaction. The liquid diluent is mixed with fresh hydrocarbon feedstock in a ratio ranging from about 0.5:1 to about 10:1 to form a diluent/fresh feed mixture.

The diluent/fresh feed mixture is then combined with an excess quantity of hydrogen gas. The type and amount of diluent in the diluent/fresh feed mixture is selected so that a substantial portion of the hydrogen gas combined with the liquid feed composition is dissolved in the liquid feed composition to form a diluent/fresh feed/dissolved hydrogen mixture. The hydrogen gas is added to the liquid diluent/fresh feed mixture in an amount so that a portion of the hydrogen gas added remains as a gas and is not dissolved within the liquid feed composition. This portion of non-dissolved hydrogen gas remains present in the feed stream in an amount of from 1 to 70 SCF/bbl (0.000178 to 0.0125 m$^3$/L) of the liquid feed composition. In particular embodiments, the non-dissolved hydrogen gas in the feed stream may be present in an amount of from 1 to 50 SCF/bbl (0.000178 to 0.0089 m$^3$/L) of the liquid feed composition. This may translate to a liquid volume of approximately 10 to 500 times greater than the volume of gas.

The hydrogen gas is combined with the liquid diluent/fresh feed mixture and may be introduced into the hydroprocessing reactor without any separation step ahead of the reactor to remove excess hydrogen gas from the feed stream. In other embodiments, separation of hydrogen gas ahead of the reactor may occur to provide residual non-dissolved hydrogen gas provided that it is within those limited amounts as discussed above. The hydrogen gas added to the liquid diluent/fresh feed mixture to form the feed stream introduced into the reactor is that necessary for the hydroprocessing reaction. No further hydrogen gas may be added to the reactor other than that combined with the liquid diluent/fresh feed mixture to form the feed stream introduced into the hydroprocessing reactor. Furthermore, the addition of hydrogen gas to the feed stream introduced into the reactor may be used to control liquid levels within the reactor, as is discussed later on.

The gas within the volume of the reactor may be maintained in a near stagnant condition. This may be achieved by controlling the removal of gas from the reactor so that the hydrogen gas flow through the reactor may be at or less than 5 ACF/hr (actual cubic ft/hr) (0.142 m$^3$/hr) per ft$^3$ (0.03 m$^3$) of reactor volume. In particular embodiments the hydrogen gas flow through the reactor may be from 0.2 ACF/hr (0.0056 m$^3$/hr), 0.3 ACF/hr (0.0085 m$^3$/hr), 0.4 ACF/hr (0.0113 m$^3$/hr), or 0.5 ACF/hr (0.0142 m$^3$/hr) per ft$^3$ (0.03 m³) of reactor volume to 3 ACF/hr (0.085 m³/hr), 4 ACF/hr (0.113 m³/hr), or 5 ACF/hr (0.142 m³/hr) per ft³ (0.03 m³) of reactor volume.

Referring to FIG. 1, a schematic of a hydroprocessing system 10 for carrying out the methods described herein is shown. The system 10 includes a hydroprocessing reactor 12 formed from a reactor vessel 14 that houses the various internal components of the reactor 12. The reactor 12 is provided with an inlet 16 at the upper end of the reactor 12 for introducing a feed stream into the interior of the reactor vessel 14. The inlet 16 is fluidly coupled to a feed line 18 for delivering a feed stream to the inlet 16.

The feed stream is formed by combining a fresh liquid hydrocarbon feed or feedstock to be treated from fresh feed line 20 that is combined with diluent or recycled liquid hydroprocessed product from lines 22, 24, respectively, to form a liquid feed composition in line 26. Hydrogen gas from line 28 fluidly coupled to a hydrogen gas source is combined with the liquid feed composition from line 26 to form the feed stream of line 18. The amount of hydrogen gas added through line 28 is controlled by control valve 30.

The intermixed liquid composition and excess hydrogen gas feed stream from line 18 is fed through upper inlet 16 into the top of a hydroprocessing reactor 12 to a distributor 32. The feed stream introduced to the reactor 12 is introduced at a rate to provide the high liquid mass flux rate discussed previously. The reactor vessel 14 houses a first catalyst bed 34 in an upper portion of the reactor containing a hydroprocessing catalyst supported by screens or other support structures. The introduced intermixed liquid composition and excess hydrogen gas may flow onto a vapor/liquid distributor tray 32 where the gas and liquid flow cocurrently from the distributor 32 over the first catalyst bed 34 in a trickle-like fashion, wherein the liquid flows over the catalyst through a nearly stagnant volume of gas within the reactor vessel interior. Reacted liquid exits the first catalyst bed 34 and falls through the nearly stagnant gas onto a chimney tray 36 where liquid and gas are separated and where the liquid level 38 may be maintained by the addition of hydrogen gas introduced through line 28. A liquid level controller 40 coupled to control valve 30 may be used to control the hydrogen gas introduced through line 28 at the diluent/fresh feed/hydrogen mixer.

Referring to FIG. 1, liquid from chimney tray 36 is discharged through outlet collector 42 to a distributor 44 of a second lower reaction zone. The effluent from the chimney tray 36 is passed from the distributor tray 44 to a second catalyst bed 46, which may contain the same or a different hydroprocessing catalyst from that of the upper catalyst bed 34. The liquid and hydrogen gas flow cocurrently over through the second catalyst bed 46 in a trickle-like fashion through a nearly stagnant volume of gas. This process may be repeated with additional catalyst beds as needed or desired.

At the final stage of hydroprocessing, the reacted liquid and gas flow from the catalyst bed 46 to a final distributor tray 48. In this particular embodiment, the liquid and gas are then separated in a hot high-pressure separator 50 housed at the base or lower end of the reactor vessel 14, wherein gas and liquids are separated at or near reactor conditions (i.e., temperature and pressure). The gas flow off of the hot high-pressure separator is discharged from the reactor through line 52. A control valve 54 may be used to control the gas flow so that the volume of gas within the reactor 12 is nearly stagnant. In other embodiments, the liquid and gas may be removed from the reactor and separated at or near reactor conditions in an external gas/liquid separator (not shown) that is external to the reactor vessel 14.

Separated liquid hydroprocessed product is removed from the bottom portion of the reactor vessel 14 through line 56 to pump 58. All or a portion of the liquid hydroprocessed product may be removed through line 60 for collection and storage or further processing. In some embodiments, a portion of the liquid hydroprocessed product may be passed to from pump 60 to recycle line 24, where it is mixed with the fresh liquid feed to be treated from line 20, as discussed earlier.

In an alternative embodiment of the process described above, at the chimney tray 36 in the upper zone of the reactor 12 additional excess hydrogen gas from line 62 is introduced into the reactor 12 within chimney tray 36. The amount of hydrogen gas added at this intermediate stage may be controlled so that the quantity of excess hydrogen gas present in the liquid from chimney tray 36 and discharged through outlet collector 42 to the second vapor/liquid distributor tray 44 is held within the range described previously (i.e., 1 to 70 SCF/bbl (0.000178 to 0.0125 m³/L) of the liquid feed composition, etc.). The liquid and gas flow cocurrently over the second catalyst bed 46 in a trickle-like fashion through a nearly stagnant volume of gas. This process may be repeated with additional catalyst beds as needed or desired.

At the final stage of hydroprocessing, the reacted liquid and gas flow through the final catalyst bed 46 to the final chimney tray 48, where it is collected. In certain embodiments, the liquid level 64 in the chimney tray 48 at the bottom of the reactor may be further maintained by the addition of hydrogen gas introduced through line 62. A liquid level controller 66 coupled to control valve 68 on line 62 may be used to control the hydrogen gas introduced through line 62.

The liquid and gas are then separated in separator 50 at or near reactor conditions, with gas being removed through line 52 and liquid hydroprocessed product being discharged through line 56 through pump 58 at a constant rate. In other embodiments, the liquid and gas may be removed from the reactor 12 and separated external to the reactor but at or near reactor conditions in an externally located gas/liquid separator (not shown).

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of hydroprocessing comprising:
    combining hydrogen gas for the hydroprocessing reaction with a liquid feed composition comprising a feedstock to be treated and a diluent to form a feed stream, a portion of the hydrogen gas being dissolved in the liquid feed composition of the feed stream, with non-dissolved hydrogen gas being present in the feed stream in an amount of from 1 SCF to 70 SCF per bbl of the liquid feed composition; and
    contacting the feed stream with a hydroprocessing catalyst of a catalyst bed while the liquid feed composition flows through a volume of nearly stagnant gas within a reactor and while maintaining a liquid mass flux within the reactor of at least 5000 lb/hr·ft² or more to form a hydroprocessed product; and further comprising separating gas from liquid hydroprocessed product in a separator located within the reactor downstream from the catalyst bed.

2. The method of claim 1, wherein:
the feedstock comprises at least one of a petroleum feedstock, a non-petroleum feedstock, a bio oil, a pyrolysis oil, a high-contaminant feedstock, and a high-olefinic feedstock.

3. The method of claim 1, wherein:
the feed stream is contacted with a hydroprocessing catalyst contained in at least two catalyst beds within the reactor.

4. The method of claim 1, wherein:
the non-dissolved hydrogen gas in the feed stream is present in an amount of from 1 SCF to 50 SCF per bbl of the liquid feed composition.

5. The method of claim 1, wherein:
the liquid mass flux within the reactor is maintained at from 5000 lb/hr·ft$^2$ to 100,000 lb/hr·ft$^2$.

6. The method of claim 1, wherein:
the liquid mass flux within the reactor is maintained at from 6000 lb/hr·ft$^2$ to 100,000 lb/hr·ft$^2$.

7. The method of claim 1, wherein:
the liquid mass flux within the reactor is maintained at from 10,000 lb/hr·ft$^2$ or more.

8. The method of claim 1, wherein:
the liquid mass flux within the reactor is maintained at from 30,000 lb/hr·ft$^2$ or more.

9. The method of claim 1, wherein:
at least a portion of the hyroprocessed product is used to form the diluent.

10. The method of claim 1, wherein:
the liquid mass flux within the reactor is maintained at greater than 10,000 lb/hr·ft$^2$.

11. The method of claim 1, wherein:
the separated gas is removed from the reactor at a rate so that the volume of gas within the reactor is maintained in a near stagnant condition.

12. The method of claim 1, further comprising:
maintaining a liquid level within the reactor by controlling the amount of hydrogen gas added to the feedstream.

13. The method of claim 1, wherein:
the volume of nearly stagnant gas has a flow rate of from 5 ACF/hr or less per ft$^3$ of reactor volume.

14. A method of hydroprocessing comprising:
combining hydrogen gas for the hydroprocessing reaction with a liquid feed composition comprising a feedstock to be treated and a diluent to form a feed stream, a portion of the hydrogen gas being dissolved in the liquid feed composition of the feed stream, with non-dissolved hydrogen gas being present in the feed stream in an amount of from 1 SCF to 50 SCF per bbl of the liquid feed composition; and
contacting the feed stream with a hydroprocessing catalyst contained in at least two catalyst beds contained within a reactor while the liquid feed composition flows through a volume of nearly stagnant gas and while maintaining a liquid mass flux within the reactor of from 10,000 lb/hr·ft$^2$ to 100,000 lb/hr·ft$^2$ to form a hydroprocessed product; and further comprising
separating gas from liquid hydroprocessed product in a separator located within the reactor downstream from at least one of the catalyst beds.

15. The method of claim 14, wherein:
the feedstock comprises at least one of a petroleum feedstock, a non-petroleum feedstock, a bio oil, a pyrolysis oil, a high-contaminant feedstock, and a high-olefinic feedstock.

16. The method of claim 14, wherein:
the liquid mass flux within the reactor is maintained from 30,000 lb/hr·ft$^2$ to 100,000 lb/hr·ft$^2$.

17. The method of claim 14, wherein:
at least a portion of the hyroprocessed product is used to form the diluent.

18. The method of claim 14, wherein:
the separated gas is removed from the reactor at a rate so that the volume of gas within the reactor is maintained in a near stagnant condition.

19. The method of claim 14, wherein:
the volume of nearly stagnant gas has a flow rate of from 5 ACF/hr or less per ft$^3$ of reactor volume.

20. The method of claim 14, further comprising:
maintaining a liquid level within the reactor by controlling the amount of hydrogen gas added to the feedstream.

* * * * *